United States Patent
Kyrre

(10) Patent No.: US 10,155,569 B2
(45) Date of Patent: Dec. 18, 2018

(54) SWIVEL FOR MOORING ARRANGEMENT HAVING AN ELECTRIC POWER GENERATOR WHICH CONVERTS RELATIVE ROTATION BETWEEN TWO ELEMENTS INTO ELECTRIC POWER

(71) Applicant: ABYSSUS MARINE SERVICES AS, Asker (NO)

(72) Inventor: Tjøm J. Kyrre, Blommenholm (NO)

(73) Assignee: ABYSSUS MARINE SERVICES AS, Asker (NO)

( * ) Notice: Subject to any disclaimer, the term of this patent is extended or adjusted under 35 U.S.C. 154(b) by 0 days.

(21) Appl. No.: 15/504,905

(22) PCT Filed: Aug. 18, 2015

(86) PCT No.: PCT/NO2015/050137
§ 371 (c)(1),
(2) Date: Feb. 17, 2017

(87) PCT Pub. No.: WO2016/032338
PCT Pub. Date: Mar. 3, 2016

(65) Prior Publication Data
US 2017/0240248 A1    Aug. 24, 2017

(30) Foreign Application Priority Data
Aug. 25, 2014   (NO) .................................. 20141038

(51) Int. Cl.
*B63B 21/20* (2006.01)
*H02K 7/18* (2006.01)
(Continued)

(52) U.S. Cl.
CPC ................ *B63B 21/04* (2013.01); *B06B 1/06* (2013.01); *B63B 21/20* (2013.01); *F16G 15/08* (2013.01);
(Continued)

(58) Field of Classification Search
CPC ............. B63B 21/20; B63B 2021/008; B63B 2021/203; B63B 2021/009; B63B 21/00;
(Continued)

(56) References Cited

U.S. PATENT DOCUMENTS 3,967,232 A * 6/1976 Mills ....................... B63C 11/48
367/130
2013/0279298 A1  10/2013 Prentice
(Continued)

FOREIGN PATENT DOCUMENTS

| | | |
|---|---|---|
| JP | 2011149294 | 8/2011 |
| WO | 2011/056241 | 5/2011 |
| WO | 2012/059760 | 5/2012 |

OTHER PUBLICATIONS

International Search Report issued in PCT/NO2015/050137, dated Sep. 11, 2015, pp. 1-2.
(Continued)

*Primary Examiner* — Harshad R Patel
*Assistant Examiner* — Brandi N Hopkins
(74) *Attorney, Agent, or Firm* — Jeffrey S. Melcher; Manelli Selter PLLC

(57) ABSTRACT

A swivel (100) for a mooring line comprises a first element (110) with a first line coupler (111) and a second element (112) with a second line coupler (113). The first element (110) and the second element (112) are rotatable relative to each other. An electric power generator (120) converts a relative rotation between the first element (110) and the second element (112) into electric power. In use, the line couplers (111, 113) are attached to separate segments of the mooring line. A pull F applied to or relieved from the mooring line causes the relative rotation. The swivel preferably contains a battery and a control unit, and may supply power to one or more sensors (130) built into or external to
(Continued)

the swivel (100). A system for monitoring a mooring arrangement is also disclosed.

14 Claims, 6 Drawing Sheets

(51) Int. Cl.
*F16G 15/08* (2006.01)
*B63B 21/04* (2006.01)
*B06B 1/06* (2006.01)
*G01L 5/10* (2006.01)
*B63B 35/44* (2006.01)
*B63B 21/00* (2006.01)

(52) U.S. Cl.
CPC .............. *G01L 5/10* (2013.01); *H02K 7/1807* (2013.01); *H02K 7/1892* (2013.01); *B63B 35/4413* (2013.01); *B63B 2021/008* (2013.01)

(58) Field of Classification Search
CPC ....... G01L 11/025; G01L 5/101; G01L 5/047; G01L 5/107; G01L 5/10; H04B 11/00
See application file for complete search history.

(56) References Cited

U.S. PATENT DOCUMENTS

2014/0190385 A1* 7/2014 Colquhoun ............. B63B 21/50
114/230.1
2016/0318591 A1* 11/2016 Jamieson ................ H02J 7/025

OTHER PUBLICATIONS

Written Opinion issued in PCT/NO2015/050137, dated Sep. 11, 2015, pp. 1-5.

* cited by examiner

SWIVEL FOR MOORING ARRANGEMENT HAVING AN ELECTRIC POWER GENERATOR WHICH CONVERTS RELATIVE ROTATION BETWEEN TWO ELEMENTS INTO ELECTRIC POWER

BACKGROUND

Field of the Invention

The present invention concerns a swivel for a mooring line and a system for monitoring a mooring arrangement comprising at least one mooring line with the swivel.

Prior and Related Art

In several applications, a moored structure is kept substantially stationary at a predetermined spot at sea, e.g. at a sea surface, by one or more mooring lines, each extending in a particular direction, i.e. azimuth and inclination, from the structure to a fixed point such as an anchor embedded in the sea floor. The present invention relates to mooring in general. Examples from the oil and gas industry include floating platforms, drilling vessels and loading buoys. Other examples of moored structures include aquaculture plants, wind or wave generators at sea and generators converting tidal currents to electric power.

In the following description and claims, a mooring line should be construed as an assembly of chains and/or ropes extending from the moored structure to a fixed point, e.g. an anchor. The rope may be made of synthetic fibres and/or steel. A typical mooring line comprises several segments of chain and/or rope connected to each other. A typical connection comprises a swivel to allow relative rotation between adjacent lengths. Thus, a swivel is any device comprising two elements that are rotatable with respect to each other. Typically, each element of the swivel has an eye that can be connected to a chain link or a thimble, e.g. by means of a shackle.

As used herein, a mooring arrangement comprises one or more mooring lines and monitoring means. The monitoring means comprises sensors disposed along the mooring line. Additional components of the monitoring system, such as a control system and/or an alarm system, are not part of the present invention and thus not described in greater detail herein. Displays and alarm systems are well known and commercially available.

The sensors disposed along the mooring line may monitor any parameter, e.g. those relevant for the integrity of the mooring line. Some sensors may detect forces, wear and tear, whereas other sensors may detect approaching vessels or other objects in order to prevent collisions. The sensors are discussed in greater detail with reference to FIG. 3.

In a first example, a collision exerts a force beyond the safety limit of some component in the mooring line, and an operational rule states that the component should be replaced regardless of whether it is actually broken or not. In this case, an accelerometer measuring the force exerted should raise an alarm in or through a control system.

In a second example, one mooring line is used and local winds and currents have moved a floating structure to an unknown position relative to its anchor. Fishing is restricted in a relatively large area due to the length of the mooring line. In this example, a transponder on the mooring line responding to a sonar signal from a fishing vessel would be beneficial.

In a third example, several mooring lines run from a floating platform producing oil and gas from an offshore field. A standby vessel maintains its position in a safe sector well away from the mooring lines, when an emergency requires it to pass a mooring line as quickly as possible. In such a case, a sensor on the mooring line would facilitate a close and safe passage by alerting the standby vessel directly or through a control system on the platform.

US20030128138 provides an example of a monitoring system of the kind discussed.

WO 2010062184 A2 discloses a system for monitoring and verification of an anchor position. The position of the anchor is detected and transmitted, e.g. by an acoustic transponder.

US 2010062184 discloses a related application, in which an instrumentation package, e.g. a so called acoustic release, transmits data acoustically. The transponders are directional, such that data are transmitted mainly in the direction of a line member leading to the receiving transponder at the surface.

All of the examples above involve at least one sensor connected to a line, and a transponder and/or transceiver for transmitting sensor data to a control system. The required power for the devices may be supplied through an electrically conducting rope from a power supply at the surface. However, there is a large risk for cutting an external cable during deployment and retrieval as described below. Thus, power and communication cables would need extensive, expensive and impractical shielding.

Thus, the devices are typically supplied with power from a battery package, and the preferred communication is by an acoustic link through the water. An acoustic link requires substantially more power than a wired link. Hence, while a battery package may feed an instrumentation package in some applications during a deployment of months or years, a battery for a heavily polled transponder or acoustic transmitter in a permanent mooring arrangement requires regular replacement. This is time consuming and expensive.

Thus, aims of the present invention include solving or alleviating at least one of these problems.

SUMMARY OF THE INVENTION

These aims are attained by a swivel according to claim 1 and a system according to claim 8 utilising the inventive swivel.

In particular, the invention concerns a swivel for a mooring line, wherein the swivel comprises a first element with a first line coupler and a second element with a second line coupler. The first element and the second element are rotatable relative to each other and the swivel comprises an electric power generator converting a relative rotation between the first element and the second element into electric power.

Preferably, the swivel also contains a battery for collecting and storing the generated electric power. The battery is charged whenever the swivel generates power and ensures that electric power is available when required.

The swivel preferably also comprises a control unit. The control unit may comprise rectifying circuits and current limiters. It may also comprise additional electronics for signal reception, processing and transmission.

The swivel may comprise a sensor of any kind, e.g. a pressure sensor, an accelerometer for measuring forces etc. Alternatively or in addition, the generator in the swivel may power a sensor or device external to the swivel.

In a preferred embodiment, the sensor is a hydrophone, i.e. an acoustic transducer capable of converting an acoustic signal to an electric signal. The resulting electric signal may in turn be processed locally in a control unit within the swivel or transmitted directly to another unit.

The swivel may further comprise a transducer arranged to convert an electric signal to an acoustic signal. The emitted acoustic signal can, for example, convey a measurement value through a body of water, e.g. to a receiver at the surface. Alternatively, the acoustic signal might be a sonar ping or similar, i.e. a signal transmitted in order to analyse its echo for detecting nearby objects.

In another aspect, the invention relates to a system for monitoring a mooring arrangement, comprising at least one mooring line with a swivel as disclosed above. The system further comprises a sensor array powered by the swivel and a communication link from the sensor array to a central controller, wherein the central controller has output means for conveying the status of the sensor array.

The term "communication link" should be construed broadly, and may comprise any suitable combination of acoustic signals, electrical signals and electromagnetic signals and associated equipment such as transducers, conducting rope and antennae. The "output means" may, for example, include a display showing the status continuously and/or some warning or alarm system alerting an incoming vessel or an operator aboard a floating platform of possible or imminent danger.

Preferably, the sensor array comprises several mooring lines extending in different directions from a moored structure and a swivel comprising a sensor. Here and in the claims, "a", "an" or "the" should be construed as "(the) at least one", e.g. "at least one swivel (each) comprising at least one sensor". Including sensor(s) in the swivel reduces power loss and the number of discrete components in the system. Both of these factors contribute to a cost effective system.

In a preferred embodiment, the communication link comprises a hydrophone adapted to receive a signal from a swivel with an acoustic transmitter as briefly discussed above. In this embodiment, acoustic signals are transmitted from the swivel through the water to, for example, a central hydrophone or receiver at the surface. From the receiver, the signals may in this case be forwarded to the central controller by known means, such as conducting rope or a radio link. If desirable, each signal may comprise an ID identifying individual swivels.

Further features and advantages will appear from the following detailed description and from the dependent claims.

BRIEF DESCRIPTION OF THE DRAWINGS

The invention will be explained by way of examples and with reference to the drawings, in which.

DETAILED DESCRIPTION

The drawings are schematic and intended to illustrate the invention. They are not necessarily to scale, and numerous details known to the skilled person are omitted for clarity.

Figure 1:
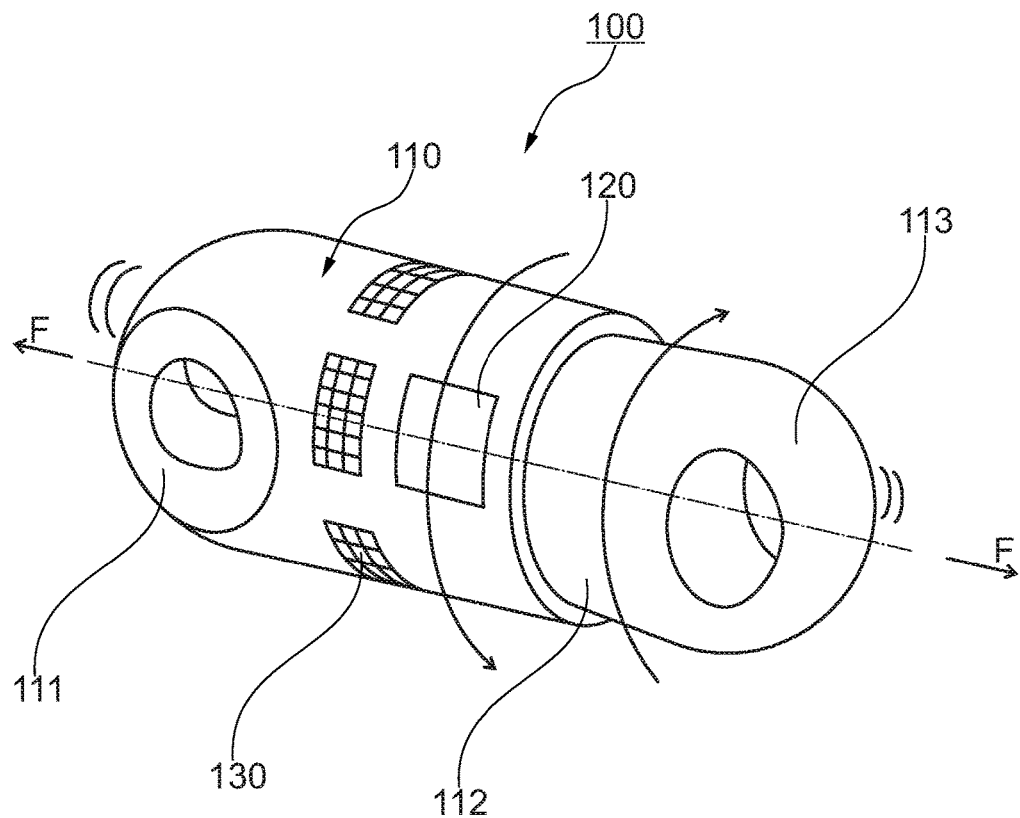
FIG. 1 illustrates a first embodiment of a swivel according to the invention.

FIG. 1 illustrates a first embodiment of a swivel 100 according to the invention. The swivel has a first element 110 with a first line coupler 111 and a second element 112 with a second line coupler 113. The line couplers 111, 113 are for connecting to segments of a mooring line, and are simply shown as eyes for connection to a chain or rope by means of shackles. The exact type of connection(s) to segments of a mooring line is of little or no concern here. The second element 112 may rotate relative to the first element 110 as required in any swivel for a mooring line. The swivel 100 of the invention also comprises an electric power generator 120 converting a relative rotation between the first element 110 and the second element 112 into electric power. In the embodiment shown on FIG. 1, sensors 130, such as acoustic transducers and transmitters, can also be included in the swivel according to the invention.

Figure 2:
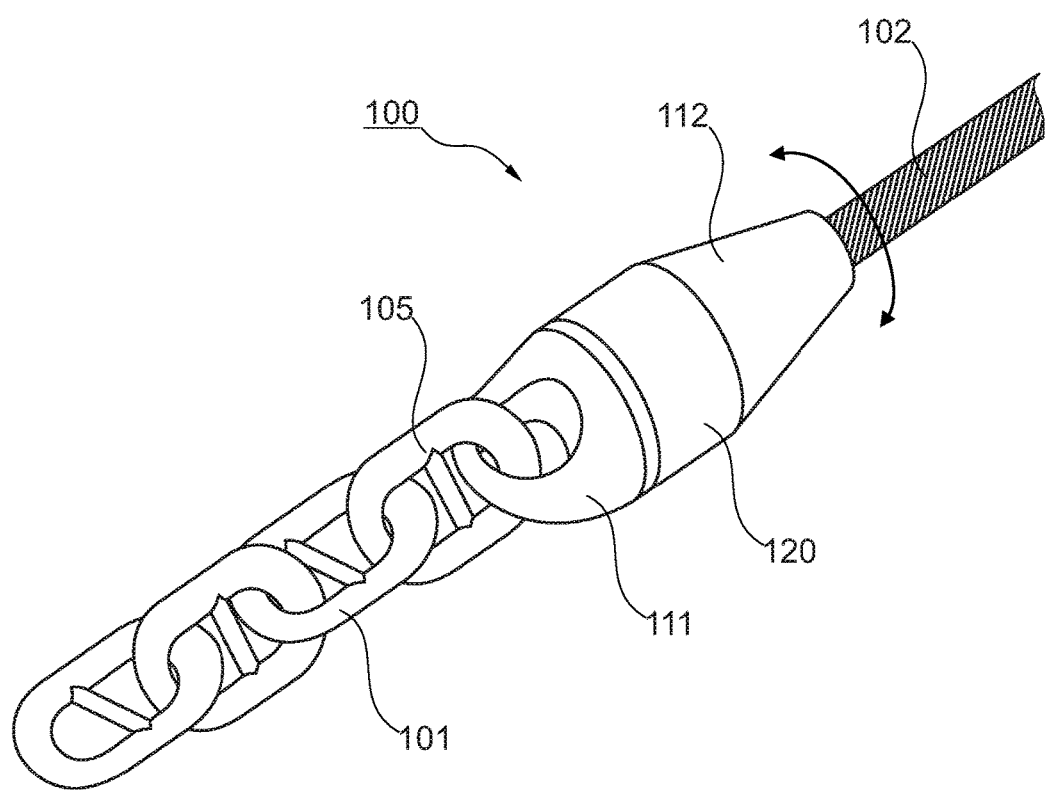
FIG. 2 illustrates a second embodiment of a swivel attached to different stretches of a mooring line.

FIG. 2 illustrates a second embodiment of the swivel 100. The first line coupler 111 is attached to a chain 101 (first segment) by means of a shackle 105. The second element 112 of the swivel is attached to a rope 102 (second segment). As noted in the introduction, the term "rope" means a rope of any material, e.g. a rope made of synthetic fibres and/or a steel wire. When a longitudinal pull is applied to the mooring line, the rope 102 tends to "unwind" and cause a first rotation of the second element 112 relative to the first element 110 and chain 101. Once the pull is relieved, the rope 102 tends to cause a rotation of the second element 112 relative to the first element 110 in a direction opposite to the first rotation. Preferably, both directions of relative rotation generate electric power in the generator 120.

The generator 120 as such is not part of the invention, and any suitable type may be used with the present invention. As well known, an electric generator generally comprises a winding rotating in a magnetic field such that electric current is induced in the winding. For simplicity, size and efficiency, generators where the magnetic field is set up by permanent magnets should be considered. In particular, magnets using rare earth elements (i.e. elements from the actinides and/or the lanthanides), such as neodymium magnets, may have a small size and still provide a suitable magnetic field. Furthermore, at least the windings should be encapsulated in a housing of any non-ferromagnetic material suitable for sub sea applications such as titanium or a suitable polymer. Of course, any other electrical components may be encapsulated similarly. The actual design of the swivel and generator assembly is left to the skilled person.

Figure 3:
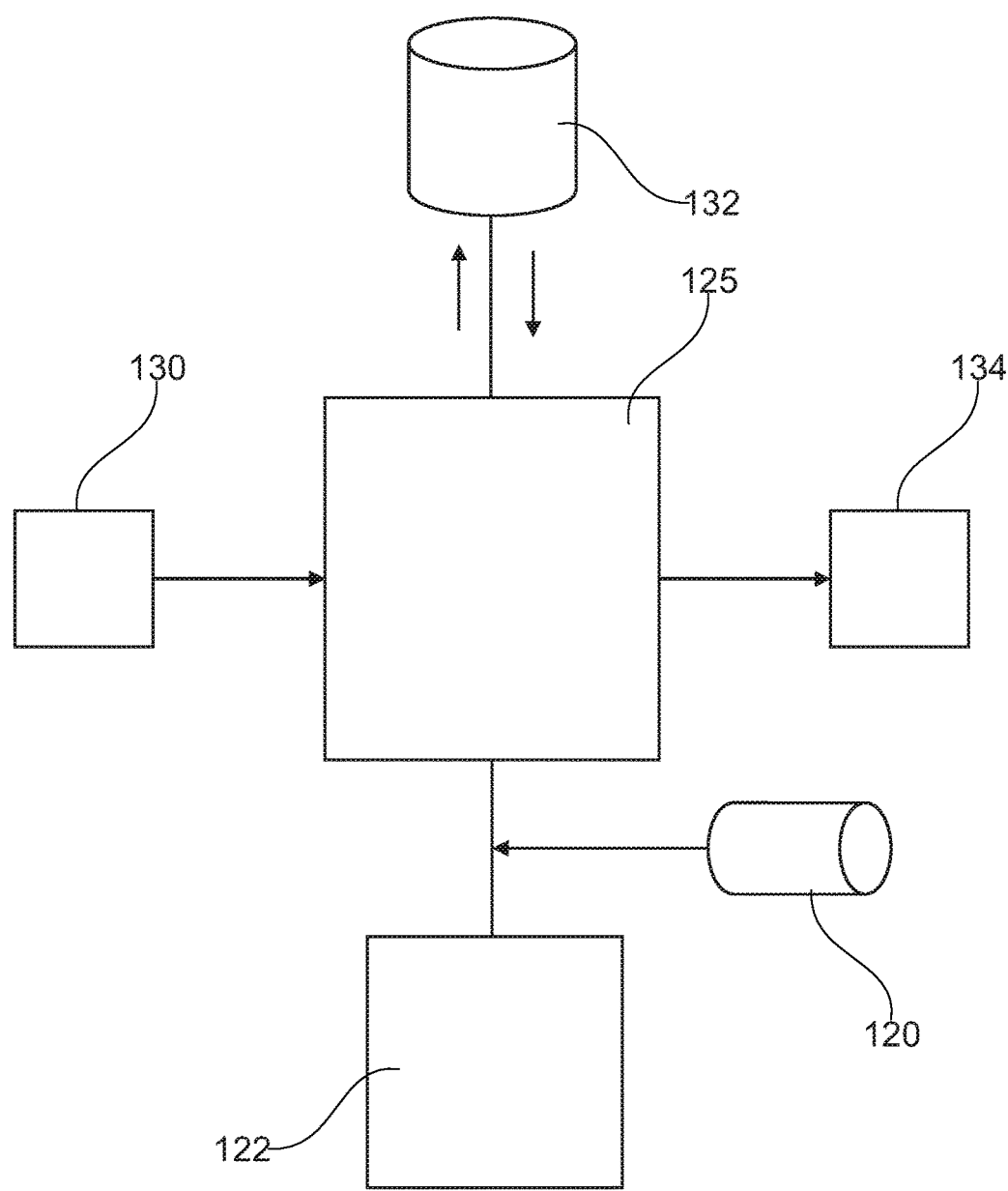
FIG. 3 is a schematic diagram of electrical components within an embodiment of the swivel.

FIG. 3 is a schematic block diagram of electrical components in a preferred embodiment. The generator 120 generates electric power whenever a pull is applied to or relieved from the mooring line as illustrated in FIG. 2. The power is rectified and possibly limited by known circuits in the generator 120 or in a control unit 125, and charges a battery 122. The battery 122 provides a steady power supply for the control unit 125, sensors 130, transceivers 132, and other devices 134 powered by the generator 120 through the battery 122.

Figure 5:
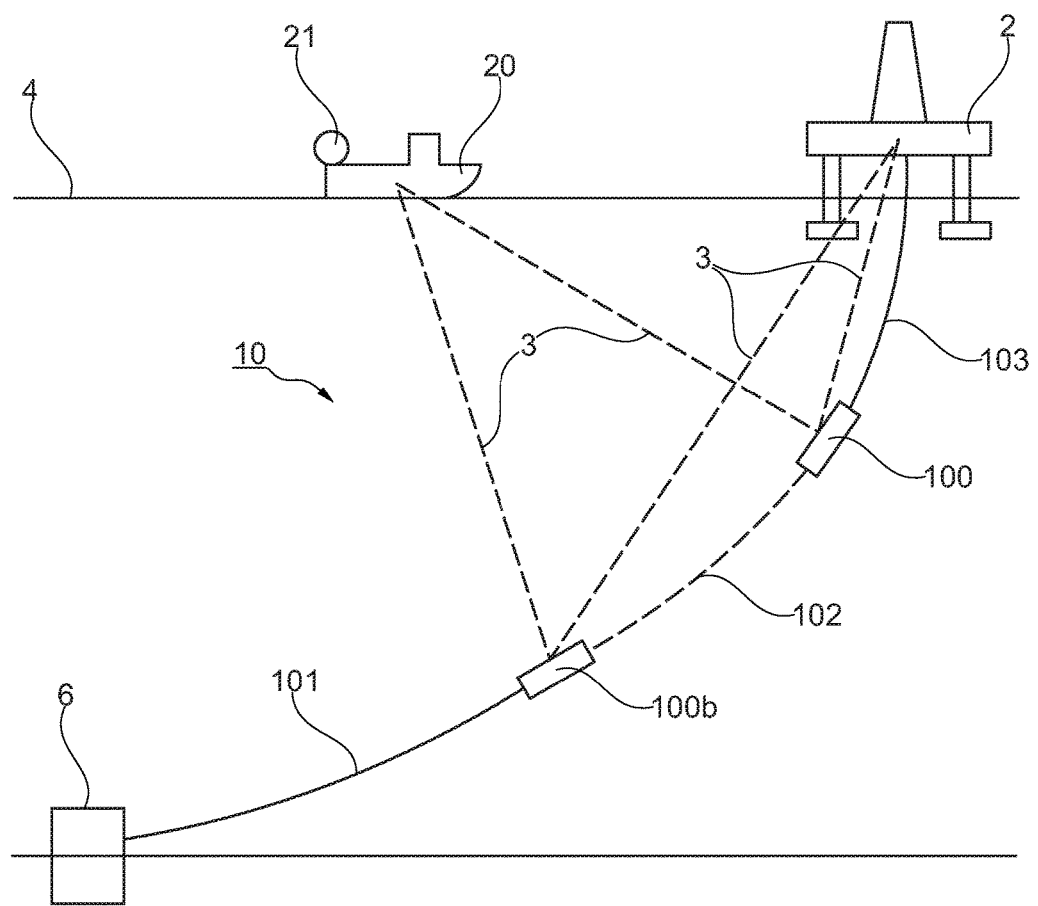
FIG. 5 depicts a mooring line extending from a moored structure.

Referring briefly to FIG. 5, consider a mooring line being deployed or retrieved over a wheel 21 on an anchor handling vessel 20. The mooring line is likely to twist and turn as it passes over the wheel 21, such that sensors 130, transceiver 132 and other devices 134 protruding from a swivel 100 are likely to be crushed, and a power or communication cable running along the mooring line risk being cut during deployment or retrieval of an anchor 6. Hence, the transceiver 132 is preferably an acoustic device, and the sensors 130 and transceivers 132 are preferably piezoelectric transducers or MEMS-devices that are mounted in recesses in the wall of the swivel 100 as indicated in FIG. 1. Sensors 130, transceiver 132 and other devices 134 are primarily examples of devices along a mooring line that requires power, and no strict distinction between sensors 130, transceiver 132 and other devices 134 is intended. For example, an accelerometer may provide data for several applications, and therefore be regarded as a separate sensor in each application; and a piezoelectric hydrophone may serve as a sensor 130 as well as the receiver in an acoustic transceiver 132 or a transponder.

Returning to FIG. 3, useful sensors 130 include one or more accelerometers for collision detection, a pressure gauge for depth measurements, a modem for acoustic ranging to determine slant range, strain gauges configured to measure tension and torque in the mooring line, an Acoustic Doppler Current Profiler (ADCP) for hydroacoustic current metering, etc. A swivel 100 may contain none, some or all of the above and other sensors, and different swivels 100 can require different sensors 130. Transceiver 132 transmits and receives acoustic signals, as indicated by arrows from and to the control unit 125. Suitable sensors 130 and transceivers 132, preferably piezoelectric implementations for the reasons mentioned above, are commercially available and need no further description herein.

The control unit 125 may amplify, digitize and/or perform other signal processing on a signal from the sensor(s) 130, as well as signals for transmitting data or received signals, e.g. to retrieve a control command. Thus, for example, the control unit 125 may be configured to supply certain parameters on request, other parameters if a certain event occurs and still other parameters at fixed intervals. The actual implementation of the control unit 125 is a design issue left to the skilled person.

Other devices, represented by reference numeral 134, can be, for example, a strobe or a reference or navigation beacon powered by the generator 120.

Figure 4:
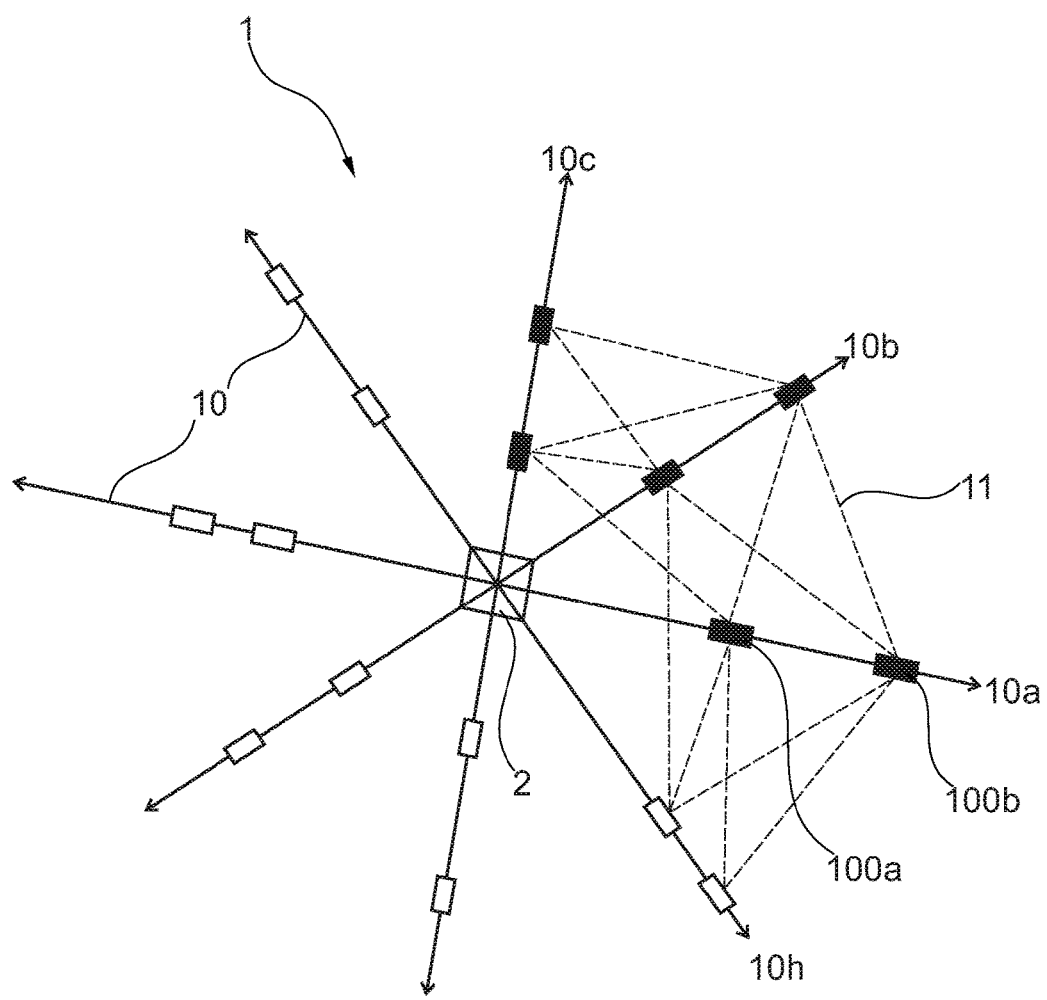
FIG. 4 illustrates a mooring arrangement using the swivel.

FIG. 4 illustrates the physical layout of a system 1 for monitoring a mooring arrangement 10a-10h for a moored structure 2, e.g. a floating platform, a fish farming pen etc. The mooring arrangement in FIG. 4 comprises eight mooring lines 10a-10h extending from the structure 2 in azimuths that are evenly distributed around the structure 2. The inclinations of the mooring lines 10a-h from the structure 2 to the seafloor may be substantially equal, or vary between the mooring lines, and of course a greater or smaller number of mooring lines 10 may be provided as needed.

Each mooring line 10, in FIG. 4 illustrated as 10a-h, respectively, comprises two swivels 100a, 100b each. The number of swivels 100 per mooring line 10 may be greater or smaller than two, and may vary from one mooring line 10a to another 10b. In the example on FIG. 4, the swivels 100a, 100b generate electric power for a sensor array 11. As discussed above, the sensors may comprise sensors for monitoring the state of the mooring lines 10a-h and/or for preventing collisions and/or for other purposes. In some embodiments some or all sensors and transmitters are built into the power generating swivels 100a, 100b to limit the number of different discrete components in the system, and thus facilitate deployment and maintenance.

FIG. 5 illustrates a mooring line 10 extending from a moored structure 2, here a platform floating on a sea surface 4, to an anchor 6 embedded in the seafloor 8. The illustrated mooring line 10 comprises three segments, i.e. a bottom chain 101 (first segment), an intermediate rope 102 (second segment), and a top chain 103 (third segment). Swivels 100, 100b are included in the mooring line 10 at each transition between chain 101, 103 and rope 102, as the rope 102 tends to cause a rotation when a pull is applied to or relieved from the mooring line 10. See the description of FIG. 2.

Figure 6:
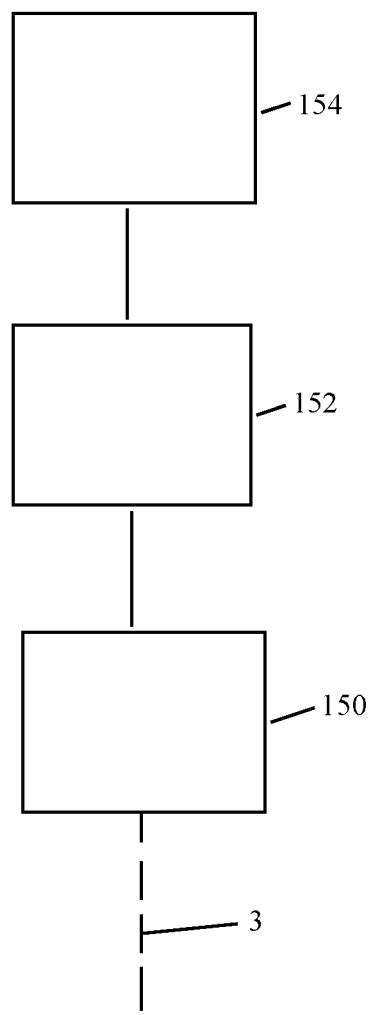
FIG. 6 illustrates a schematic diagram of electrical components of the central control unit.

The dotted lines at reference numeral 3 represent an acoustic part of the communication link 3 from the swivels 100, 100b to a central receiver 150 at the surface, shown in FIG. 6. The central receiver 150, which is connected to the central controller 152 and output means 154, can, for example, be located on the moored structure 2 and/or aboard an anchor handling vessel 20. Parameters transmitted through the communication link 3 can, for example, include accelerometer data for collision detection, which are important for the moored structure 2 also at times when no anchor handling is performed, and torque data, which are especially important for the anchor handling vessel 20 when the anchor 6 is deployed or retrieved.

The invention has been explained by means of examples. These examples are provided for illustration only, and do not limit the scope of the following claims.

The invention claimed is:

1. A swivel configured for connecting first and second segments of a mooring line to allow relative rotation between the first and second segments connected by the swivel, the swivel comprising:
   a first element comprising a first mooring line coupler configured for connecting to the first segment of the mooring line;
   a second element connected to the first element, the second element comprising a second mooring line coupler configured for connecting to the second segment of the mooring line, wherein the first element and the second element are rotatable relative to each other; and
   an electric power generator configured for converting a relative rotation between the first element and the second element caused by the relative rotation between the first segment and the second segment into electric power, wherein the swivel is configured for connecting the first and second segments of the mooring line to keep a moored structure substantially stationary at a predetermined spot at sea.

2. The swivel according to claim 1, further comprising a battery for collecting and storing the generated electric power.

3. The swivel according to claim 2, further comprising a control unit in communication with the electric power generator.

4. The swivel according to claim 1, further comprising a sensor.

5. The swivel according to claim 4, wherein the sensor is selected from a group comprising an accelerometer, a hydrophone, a pressure gauge, a slant range meter, a strain gauge arranged to measure tension and/or torque and an Acoustic Doppler Current Profiler.

6. The swivel according to claim 1, further comprising a transceiver arranged to convert an electric signal to an acoustic signal and vice versa.

7. The swivel according to claim 1, further comprising other devices powered by the electric power generator.

8. A system for monitoring a mooring arrangement comprising:
   at least one mooring line having the swivel according to claim 1 connecting the first and second segments of the mooring line;
   a sensor array powered by the electrical generator; and
   a communication link from the sensor array to a central controller, wherein the central controller comprises output means for conveying the status of the sensor array.

9. The system according to claim 8, wherein the sensor array comprises a plurality of mooring lines extending in different directions from a moored structure and a swivel further comprising a sensor.

10. The system according to claim 8, wherein the output means comprises a display and/or alerting means.

11. A method of mooring a moored structure by a mooring line and generating electric power from the mooring line comprising:
   anchoring the moored structure at a predetermined spot at sea by the mooring line, the mooring line comprising at least one swivel connecting a first segment and second segment of the mooring line to allow relative rotation between the first and second segments, the swivel comprising:
      a first element comprising a first mooring line coupler connected to the first segment;
      a second element connected to the first element, the second element comprising a second mooring line coupler connected to the second segment of the mooring line, wherein the first element and the second element are rotatable relative to each other; and
      an electric power generator configured for converting a relative rotation between the first element and the second element caused by the relative rotation between the first segment and the second segment into electric power;
   allowing the first segment to rotate relative to the second segment causing the relative rotation between the first element and the second element; and
   the electric power generator converting the relative rotation between the first element and the second element into the electric power.

12. The method according to claim 11, further comprising powering a sensor array by the electric power.

13. The method according to claim 12, further comprising conveying information from the sensor array to a central controller through a communication link between the sensor array and the central controller; and
   the central controller conveying the status of the sensor array to output means.

14. The method according to claim 11, further comprising charging a battery with the electric power.

* * * * *